Patented Sept. 19, 1950

2,523,227

UNITED STATES PATENT OFFICE 2,523,227

PLANT GROWTH CONTROL MATERIALS

Wendell R. Mullison, Midland, Mich., assignor to The Dow Chemical Company, Midland, Mich., a corporation of Delaware No Drawing. Application May 22, 1948, Serial No. 28,731

4 Claims. (Cl. 71—2.6)

This invention relates to a plant growth control material and is particularly directed to a method and composition for the selective control of weeds as well as the control of the growth or killing of plants generally.

An object of this invention is to provide a new and improved method and composition for the selective control of weeds and the control of the growth and killing of plants. Additional objects will become apparent from the following specification.

I have discovered that the ester of dipropylene glycol phenyl mono-ether and 2,4-dichlorophenoxy-acetic acid possesses certain advantages over related herbicide materials. This compound, which is the phenoxy-propoxy-propyl ester of 2,4-dichlorophenoxy-acetic acid, is of low volatility and may be employed for the control of vegetation with little danger of injury to adjacent untreated plants from vapors of the compound arising from treated surfaces. Compositions employing this compound are adapted to produce a selective control of broad leaf weeds in narrow leaf grains and certain other crop plants with a minimum of danger to the growing crop.

In accordance with the present invention the toxicant may be compounded with various finely divided solid carriers, such as bentonite, fuller's earth, diatomaceous earth, volcanic ash, pyrophyllite, talc, chalk, bentonite and the like, to form dust compositions. These compositions may be employed as concentrates and subsequently diluted with an additional inert solid carrier to form dusts, or suspended in water or other inert liquid carrier to form sprays.

Similarly, the compound may be incorporated in intimate mixture with a wetting and emulsifying agent, such as sodium lauryl sulphate, glyceryl oleate, sulphonated aromatic hydrocarbons, blood albumin, sulfonated oils, metal caseinates, complex organic ester derivatives, sulfite pulp liquor extract, aromatic aliphatic ether alcohols and the like, to form concentrates. Such concentrates are readily dispersible in liquid carriers to form sprays containing the toxicant in any desired amount. The toxicant preferably constitutes from about 5 to 95 per cent by weight of the concentrate. The choice of wetting and emulsifying agent and the amount thereof employed are determined by the ability of the agent to facilitate the dispersion of the concentrate in water to produce desired spray compositions.

Alternatively, the toxicant may be incorporated in other conventional carriers, such as solvents, oils, or oil-in-water emulsions to form spray mixtures. These compositions may be employed as concentrates and subsequently suspended in water or other liquid carrier.

The compound may be employed in simple aqueous dispersion or incorporated in other herbicide and plant growth control compositions. The toxicants in such other compositions must not react with the 2,4-dichlorophenoxy-acetic acid ester in such a manner as to reduce its effectiveness.

The application of these compositions to plant foliage gives rise to varying degrees of response in plants depending upon factors such as the nature of the plant, the strength of the composition and the amount applied per unit area, as well as the weather conditions of temperature, moisture, sun exposure, etc. Most broad leaf plants are more sensitive to the action of the toxic agent than are narrow leaf plants and grasses. The growth of the plant may be affected by small doses, resulting in stunting, whereas larger doses may kill the foliage or the plant itself. Thus, it is possible to effect a selective treatment of mixed stands of broad and narrow leaf plants, such as broad leaf weeds in lawn grasses or grain crops, by killing or stunting the broad leaf weeds. Even when the weeds are not killed, but only retarded in growth, the crop is enabled to choke out the weeds by reason of its more vigorous growth.

When the plant surfaces are wet with rain or dew the action of these herbicidal compositions is less selective than when the surfaces are dry. When a selective control is desired, therefore, the treatment is advisedly made on a warm day after the dew has dried.

The concentration of toxicant in growth control and herbicidal spray compositions according to the invention may be from 0.01 to 1.0 per cent by weight in water or other inert liquid carrier. In dusts the concentration of the toxicant may be from 1 to 40 per cent by weight. The new ester toxicants have a cumulative effect upon plants, so that multiple applications of dust or spray preparations of lower strength may destroy vegetation, although a single application may not be particularly phytotoxic.

In non-selective applications, the dust and spray compositions of the present invention are applied to vegetation to obtain a substantially complete coverage of the plant surfaces at least a short time prior to heavy precipitation. In the selective control of weeds, a scattered distribution of the toxic composition on the surfaces of the leaves of the weeds is generally sufficient to accomplish growth control with a minimum of danger to the plant crop.

The exact dosage of the toxicant to be applied per acre is dependent upon the concentration of the toxicant, in the composition, the susceptibility of the plants to be controlled, and the presence or absence in the spray or dust mixture of other ingredients such as wetting and emulsifying agents. In selective operations, this dosage is also dependent upon the tolerance of the crop. In non-selective control, good results are obtained when a minimum of 0.25 pound of the toxicant is applied per acre in from 50 to 400 gallons of spray. In selective applications, a dosage of from 0.25 to 2.0 pounds of the toxicant in from 5 to 200 gallons of water per acre is desirable. A spray volume of from 25 to 50 gallons per acre will give good selective results and smaller amounts are commonly employed.

The new compositions may be applied by conventional methods. One preferred method of operation consists of applying sprays under pressure by means of a boom attached to a mobile spray outfit, the boom connecting directly to the spray tank and being equipped with downwardly directed nozzles distributed at intervals along its length. Such equipment permits the treatment of a considerable swath of grain or other plant crop with a minimum of mechanical injury to the crop. In large scale operations, dusts or low volume sprays may be applied from an aeroplane. This is particularly advantageous in the treatment of extensive stands of grain where the possibility of injury to other crops from air-borne residues and drift is at a minimum.

Phenoxy-propoxy-propyl 2,4-dichlorophenoxy-acetate is an oily liquid having a refractive index (n/D) of 1.5393 at 60° C., somewhat soluble in many organic solvents and substantially insoluble in water. It is stable to light and air, not appreciably affected by carbon dioxide, non-corrosive to the skin of man and higher animals, and of low volatility. The ester compound may be represented by the following formula:

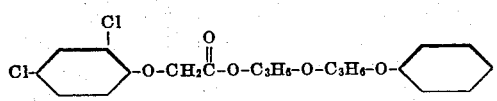

The ester may be prepared by reacting a molecular proportion of 2,4-dichlorophenoxy-acetic acid with at least a molecular proportion of phenoxy-propoxy-propanol in the presence of a dehydration catalyst, such as sulphuric acid. In such preparations, the reactants and catalyst are mixed together and heated for one hour or longer at a temperature of 50° to 75° C. Better yields are obtained when an excess of the ether alcohol is employed, and water of reaction is removed as formed. Upon completion of the reaction, the mixture is diluted with carbon tetrachloride or other suitable water-immiscible solvent and the catalyts and unreacted 2,4-dichlorophenoxy-acetic acid neutralized with an alkali, such as dilute aqueous sodium carbonate. The resulting mixture separates into aqueous and solvent layers. The solvent layer, which contains the desired ester, is washed several times with water to extract the water-soluble salts of catalyst and unreacted 2,4-dichlorophenoxy-acetic acid. The solvent is then removed by distillation at reduced pressure to obtain the ester.

EXAMPLE 1

A concentrate having the following percentage composition by weight was prepared by mixing the constituent materials together at room temperature.

*Concentrate A*

| | Per cent |
|---|---|
| Phenoxy-propoxy-propyl ester of 2,4-dichlorophenoxy-acetic acid | 37.6 |
| (Tween 40) sorbitan monopalmitate polyoxyethylene derivative | 20.0 |
| Acetone | 42.4 |

This concentrate was a free flowing liquid, somewhat oily in nature, and readily dispersible in water to produce herbicide sprays.

EXAMPLE 2

A spray composition was prepared from Concentrate A by vigorously agitating a quantity of the concentrate in water sufficient to obtain an aqueous dispersion containing the ester in an amount equivalent to 0.2 per cent by weight 2,4-dichlorophenoxy-acetic acid. The spray composition was applied in mid-growing season at the rate of 75 gallons per acre for the selective control of broad leaf weed plants in a lawn area. The area selected for treatment was 3 feet wide and 100 feet long and consisted of established turf in which Kentucky blue and red top were the principal grasses. Plantain, buckhorn, dandelions, bull thistle, and hop clover were scattered throughout the selected area. Four days following the application of the herbicide, the grass appeared to be unaffected when compared with the untreated control plot, but the broad leaf weed plants in the treated area showed definite hormone response, as evidenced by the twisting and bending of their stems and foliage. Two months following the treatment, the grass in the treated area was of a vigorous green color and in an active state of growth, but the broad leaf weeds were severely affected, the majority being dead and the remainder in an injured and dying condition. In the control plot the weeds had flourished at the expense of the grass, the latter appearing brown and burned and with little indication of new growth.

EXAMPLE 3

A spray was compounded from Concentrate A, by the method of Example 2, in the form of an aqueous dispersion of the phenoxy-propoxy-propyl 2,4-dichlorophenoxy-acetate in an amount equivalent to 0.1 per cent by weight of 2,4-dichlorophenoxy-acetic acid. This composition was applied in mid-season on an area in an oat field for the selective control of a heavy infestation of sow thistle. The application was made at the rate of 150 gallons per acre. One week following the treatment, the sow thistles appeared to have been severely affected, while the oat plants showed no evidence of hormone response. The oats continued in an active state of growth throughout the growing season and produced a normal crop of grain. Two months following the treatment, all the sow thistles in the treated area were dead.

EXAMPLE 4

55 parts by weight of fuller's earth are wet with 45 parts of phenoxy-propoxy-propyl 2,4-dichlorophenoxy-acetate dissolved in methylene chloride. This concentrate is then evaporated to dryness, mixed with finely divided prophyllite and hammermilled thru a 1/16 inch screen to produce a dust composition containing the ester toxicant in amount equivalent to 5 per cent by weight of 2,4-dichlorophenoxy-acetic acid. This composition may be used for the control of bindweed, thistle, ragweed, wild lettuce, mustard, pigweed, and wild carrot.

EXAMPLE 5

The spray composition of Example 2 was applied to two different plots of bracken ferns at the rate of 1500 gallons per acre. Two weeks following the application, all the ferns in both plots were severely affected. The majority of the ferns were dead, and those remaining appeared to have been fatally injured.

EXAMPLE 6

A spray was prepared from Concentrate A, as described in Example 2, to obtain an aqueous dispersion of the ester toxicant in an amount equivalent to 0.1 per cent by weight of 2,4-dichlorophenoxy-acetic acid. The spray was applied for the control of Canada thistle at the rate of 150 gallons per acre. Three weeks following the treatment, all the thistles appeared to have been severely affected, with the majority either dead or in a dying condition.

EXAMPLE 7

In a similar fashion, an aqueous dispersion was prepared from Concentrate A containing the ester toxicant in an amount equivalent to 0.0025 per cent by weight of 2,4-dichlorophenoxy-acetic acid. The spray was employed to wet the surfaces of young tomato plants about six inches tall. The plants were observed daily for responses attributable to the treatment. It was found that all of the tomato plants were stunted by the treament described and died in 18 days.

EXAMPLE 8

The volatility of the residue of the ester was tested by exposing young tomato plants to the vapors arising from surfaces previously wet with the compound. In these operations, young tomato plants in pots and two inch petri dishes partially filled with the ester were placed side by side on glass plates and covered by glass jars. After 16 hours exposure, the plants were removed and observed for hormone response. The test plants exhibited no injury or nastic response attributable to the growth control material.

The compounds claimed as herbicides herein are claimed as new compounds per se in the application of Edgar C. Britton et al. Serial No. 28,733 filed May 22, 1948.

I claim:

1. A composition for controlling the growth of vegetation which comprises a carrier and dispersed therein as an active toxic ingredient the phenoxy-propoxy-propyl ester of 2,4-dichlorophenoxy-acetic acid.

2. A composition for controlling the growth of weeds which comprises a liquid carrier and dispersed therein as an active toxic ingredient the phenoxy-propoxy-propyl ester of 2,4-dichlorophenoxy-acetic acid in the amount of from 0.01 to 1.0 per cent by weight of the composition.

3. A herbicide dust composition comprising a finely divided solid carrier and dispersed thereon as an active toxic ingredient the phenoxy-propoxy-propyl ester of 2,4-dichlorophenoxy-acetic acid in the amount of from 1 to 40 per cent by weight of the dust.

4. A herbicide concentrate comprising an active toxic ingredient in intimate mixture with a wetting and emulsifying agent, the agent being capable of facilitating the dispersion of the composition in water, the active ingredient being the phenoxy-propoxy-propyl ester of 2,4-dichlorophenoxy-acetic acid and constituting from 5 to 95 per cent by weight of the concentrate.

WENDELL R. MULLISON.

REFERENCES CITED

The following references are of record in the file of this patent:

UNITED STATES PATENTS

| Number | Name | Date |
|---|---|---|
| 2,390,941 | Jones | Dec. 11, 1945 |
| 2,396,513 | Jones | Mar. 12, 1946 |

OTHER REFERENCES

Chemical Abstracts, vol. 41, June 20, 1947, columns, 3902 to 3912. (Abstracting Botan. Gaz. 107, 476–507 (1946).)